Nov. 9, 1965  W. R. BAUER  3,217,188
AUTOMATIC PROGRAM SELECTING CONTROLLER
Filed Sept. 20, 1962  7 Sheets-Sheet 1
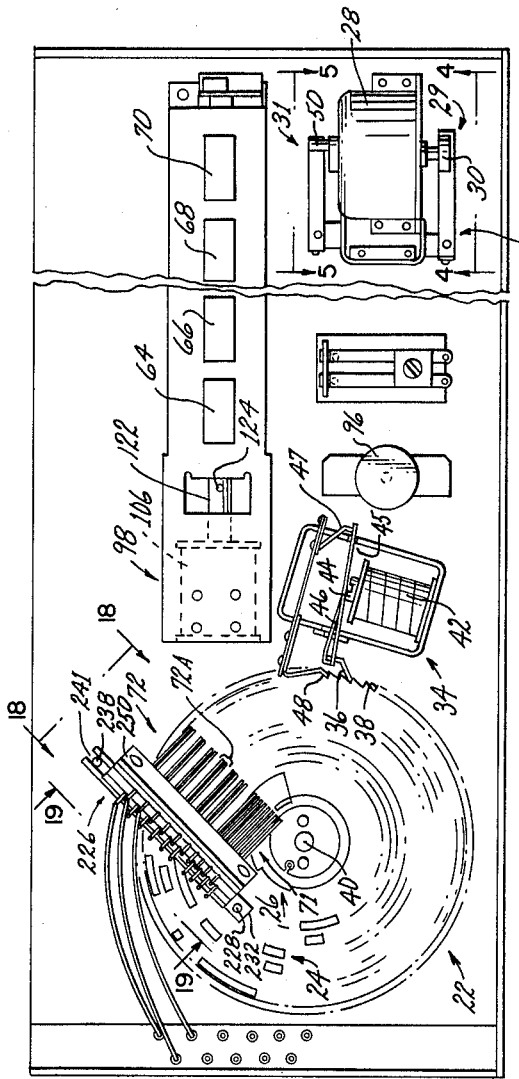
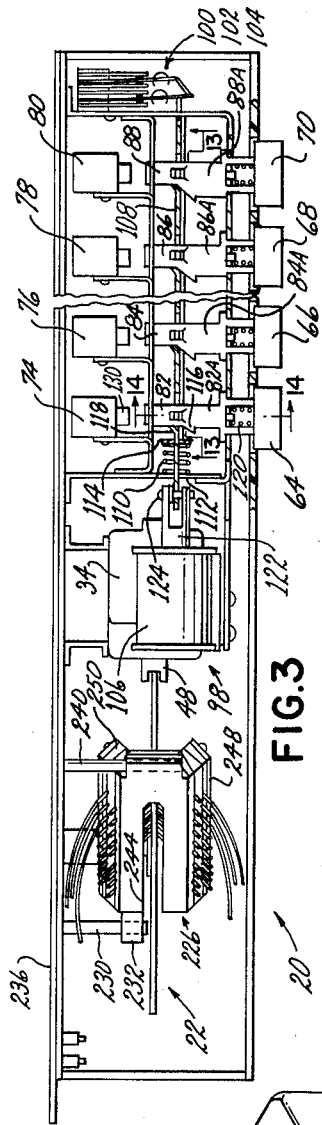
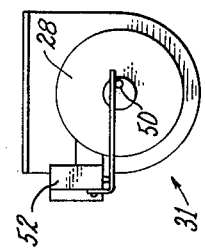
INVENTOR
WERNER ROBERT BAUER
BY Robert R. Candor
HIS ATTORNEY

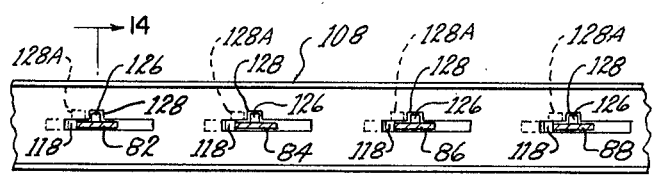
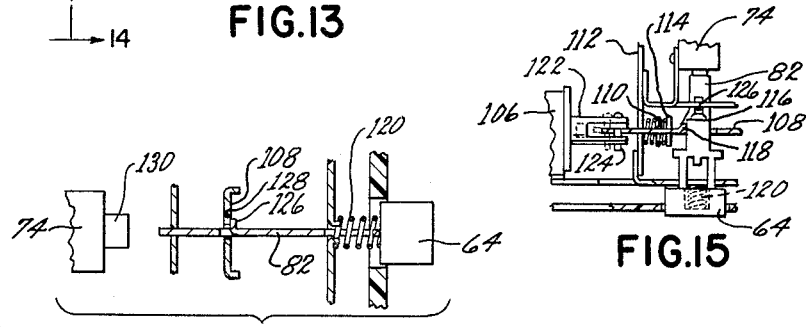
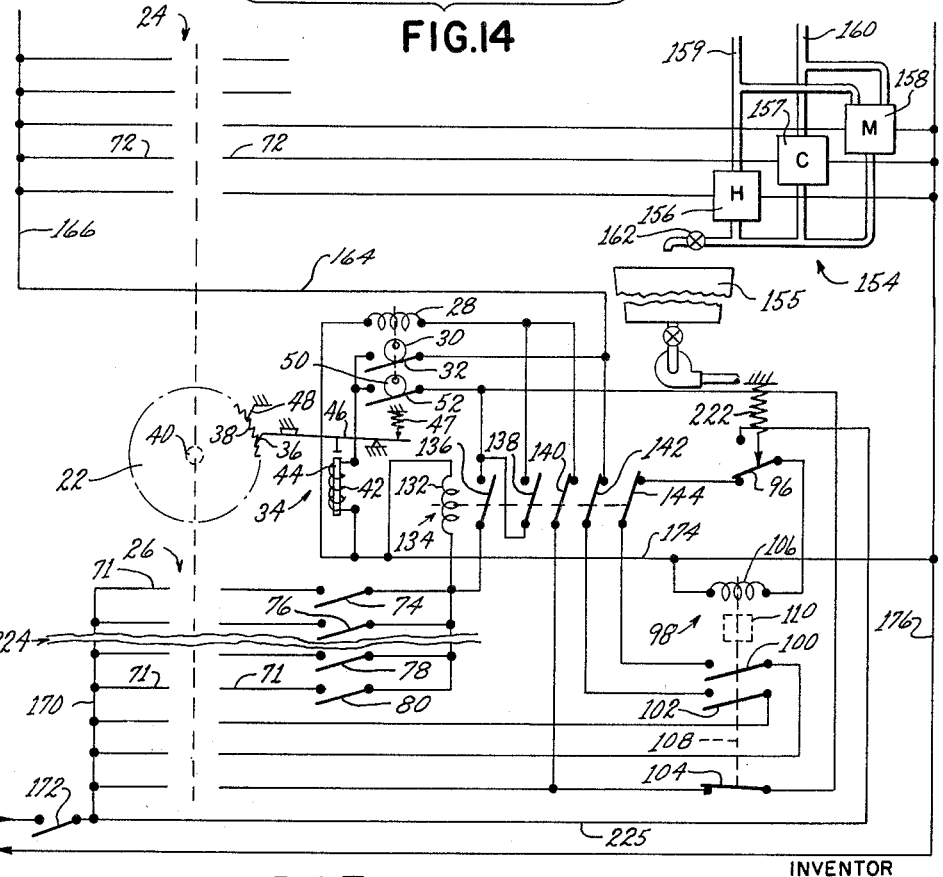

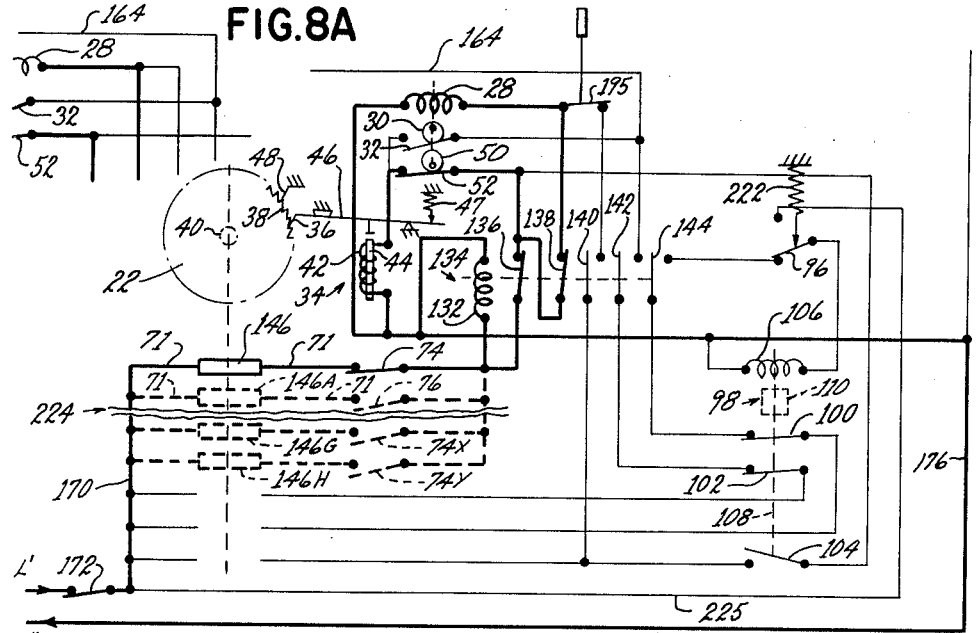
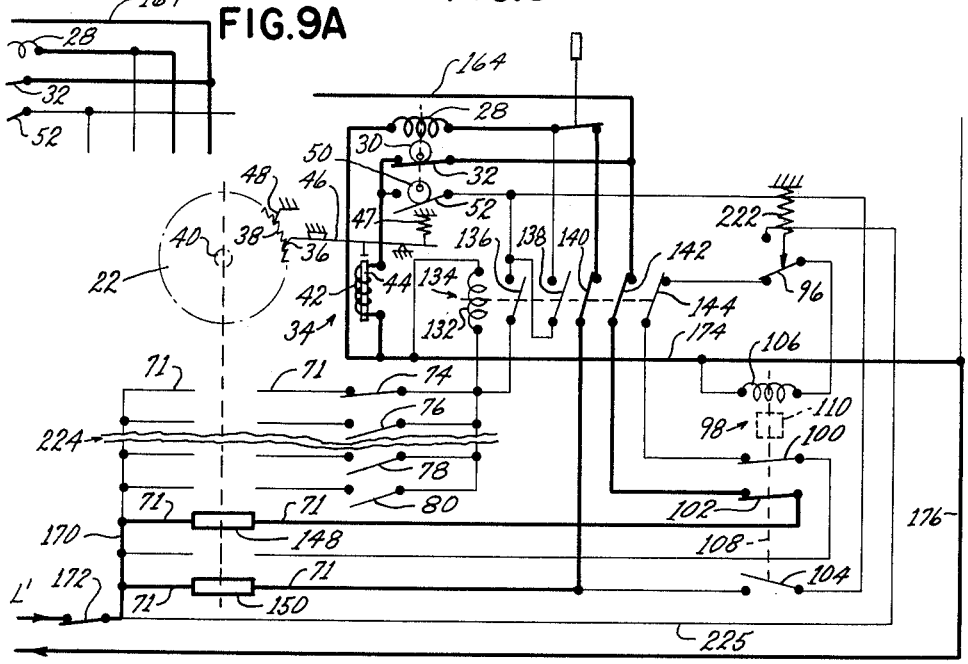

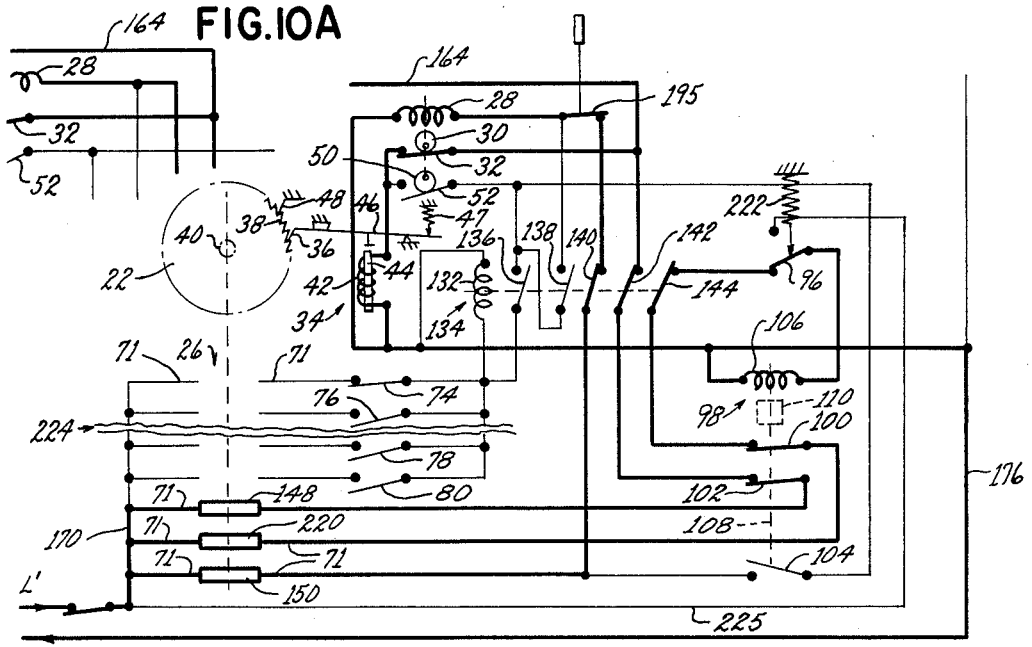
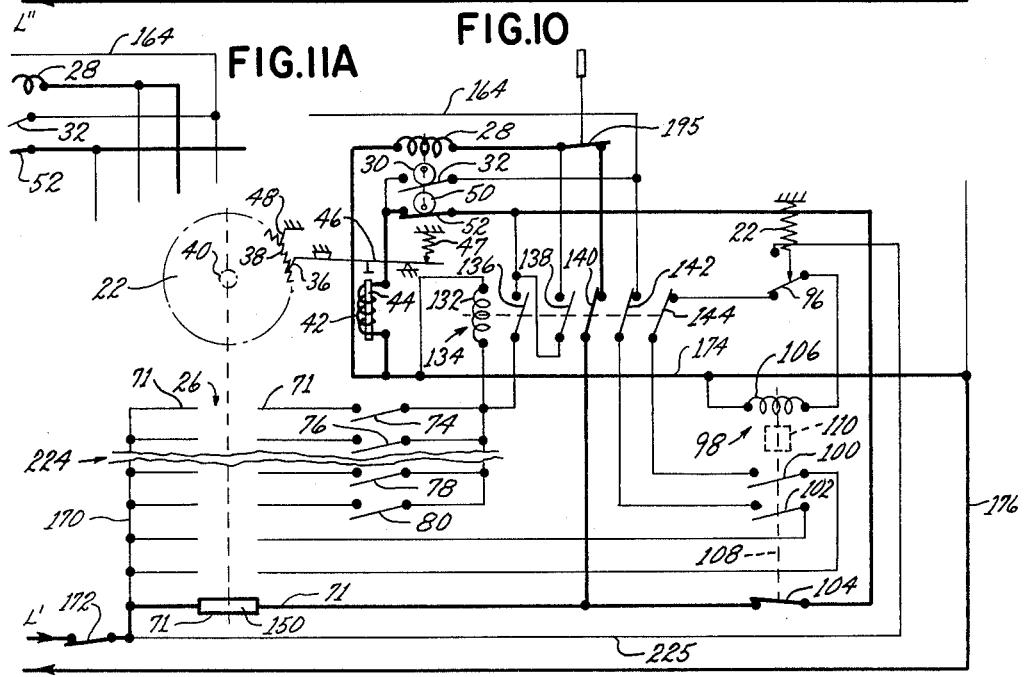

Nov. 9, 1965 W. R. BAUER 3,217,188
AUTOMATIC PROGRAM SELECTING CONTROLLER
Filed Sept. 20, 1962 7 Sheets-Sheet 6
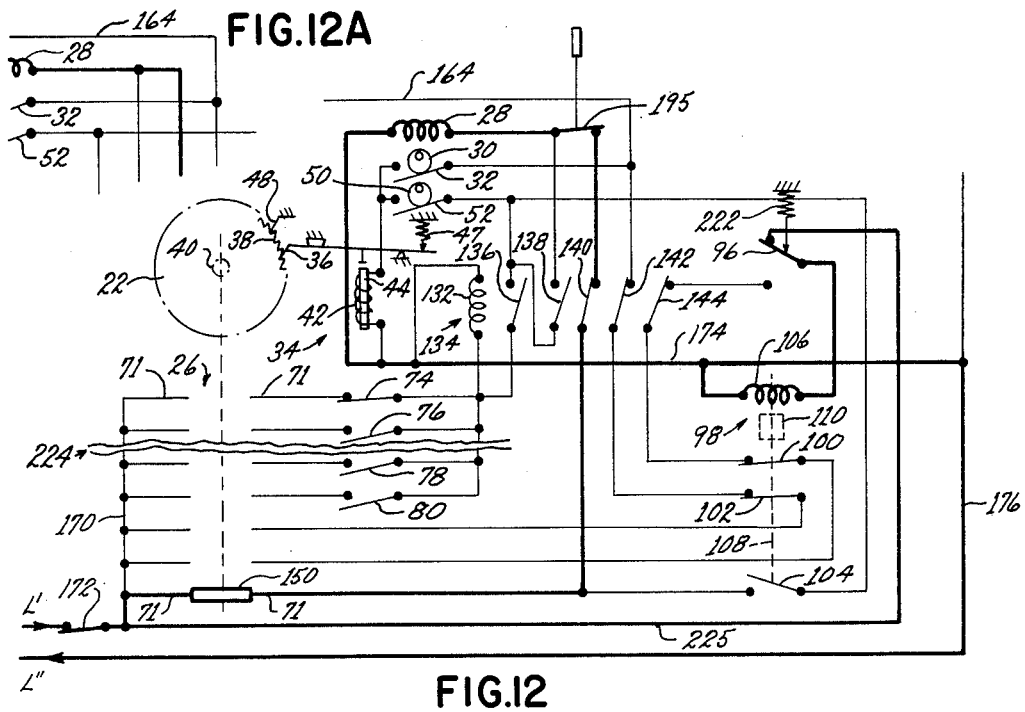
FIG.12A
FIG.12
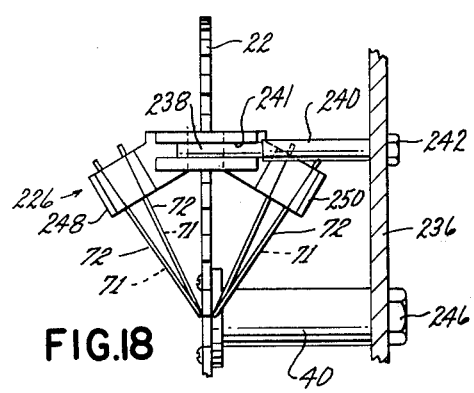
FIG.18
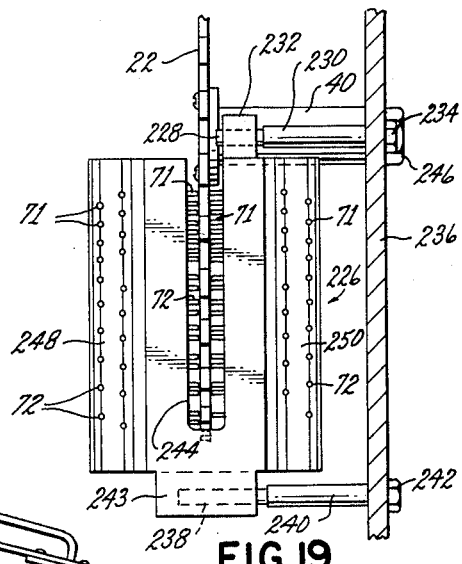
FIG.19
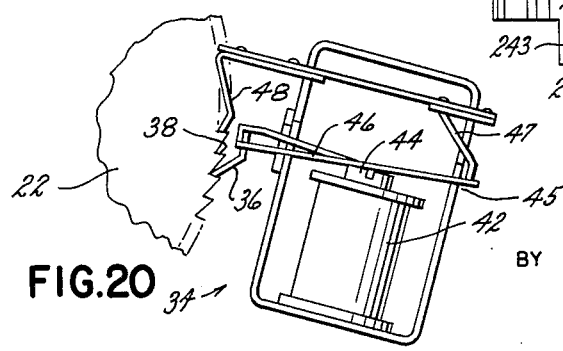
FIG.20
INVENTOR
WERNER ROBERT BAUER
BY Robert R Candor
HIS ATTORNEYS Nov. 9, 1965    W. R. BAUER    3,217,188
AUTOMATIC PROGRAM SELECTING CONTROLLER
Filed Sept. 20, 1962    7 Sheets-Sheet 7

INVENTOR
WERNER ROBERT BAUER
BY
Robert R. Cander
HIS ATTORNEY

United States Patent Office 3,217,188
Patented Nov. 9, 1965

3,217,188
AUTOMATIC PROGRAM SELECTING
CONTROLLER
Werner Robert Bauer, Columbus, Ohio, assignor to Robertshaw Controls Company, a corporation of Delaware
Filed Sept. 20, 1962, Ser. No. 224,980
9 Claims. (Cl. 307—141.4)

This invention relates to an automatic controller and method for controlling programs produced by various mechanisms, such as automatic washing machines and the like.

The controller of this invention is capable of controlling a plurality of separate programs each having sequential control impulses.

The invention provides selecting means for selecting the production of any one of such programs.

For example, a program carrying member, such as a disc, may be provided with a plurality of programs of impulse producing bands. The member or disc may be movable or rotatable at relatively slow speed while such programs are being produced.

The program carrying member or disc may be movable or rotatable at relatively high speed to select any desired one of said programs.

The controller may have means to cause such member or disc to move at such relatively high speed to select the desired program. For example, the controller may have a plurality of manipulators or push buttons which may be selectively actuated or pushed, and the selected manipulator or push button may have means automatically to advance the member or disc to the desired selected program.

The program impulses may be automatically prevented from being actuated while the member or disc is moving or rotating at selecting high speed.

Other features of this invention are apparent from this description, the appended claimed subject matter, and/or the accompanying drawings in which:

FIGURE 1 is a perspective view of a domestic washing machine provided with a controller according to this invention.

FIGURE 2 is a diagrammatic side view, in enlarged scale of the controller shown in FIGURE 1.

FIGURE 3 is a diagrammatic top view of the controller shown in FIGURE 2.

FIGURE 4 is a side view along line 4—4 of FIGURE 2.

FIGURE 5 is a cross-section along line 5—5 of FIGURE 2.

FIGURE 7 is a view similar to a portion of FIGURE 6, but showing the controller applied to a washing machine having a timed fill control.

FIGURE 8 is a view of a portion of FIGURE 6 showing certain parts producing a fast stepping, program selecting action.

FIGURE 8A shows a portion of FIGURE 8 applied to the timed fill system shown in FIGURE 7.

FIGURE 9 shows a portion of FIGURE 7 with the parts performing a selected wash program.

FIGURE 9A shows a portion of FIGURE 9 applied to the timed fill system shown in FIGURE 7.

FIGURE 10 shows a portion of FIGURE 6 with the system at the finish of a selected wash program and when the latching mechanism solenoid has been energized ready to release the latching mechanism.

FIGURE 10A shows a portion of FIGURE 10, as applied to the timed fill control system of FIGURE 7.

FIGURE 11 shows a portion of FIGURE 6 when the system is being returned to the zero or start position after the action of FIGURE 10 or 10A of FIGURE 12.

FIGURE 11A shows a portion of FIGURE 11 applied to the timed fill system.

FIGURE 12 shows a portion of FIGURE 6, while the system is being released by the emergency button, preparatory to the placing of the system in a return condition as shown in FIGURE 11.

FIGURE 12A shows a portion of the timed fill system corresponding in action to FIGURE 12.

FIGURE 13 is a side view, in enlarged scale, of a portion of FIGURE 3 and taken along the line 13—13 of FIGURE 3.

FIGURE 14 is a cross-section taken along the line 14—14 of FIGURES 3 and 13.

FIGURE 15 is a top view of a portion of FIGURE 3 showing one of the push buttons in latched position.

FIGURE 18 is a transverse view of a portion of FIGURE 2 taken along the line 18—18 of FIGURE 2.

FIGURE 19 is a transverse view of a portion of FIGURE 2 taken along the line 19—19 of FIGURE 2.

FIGURE 20 is an enlarged view of a portion of the stepping relay.

Figure 6:
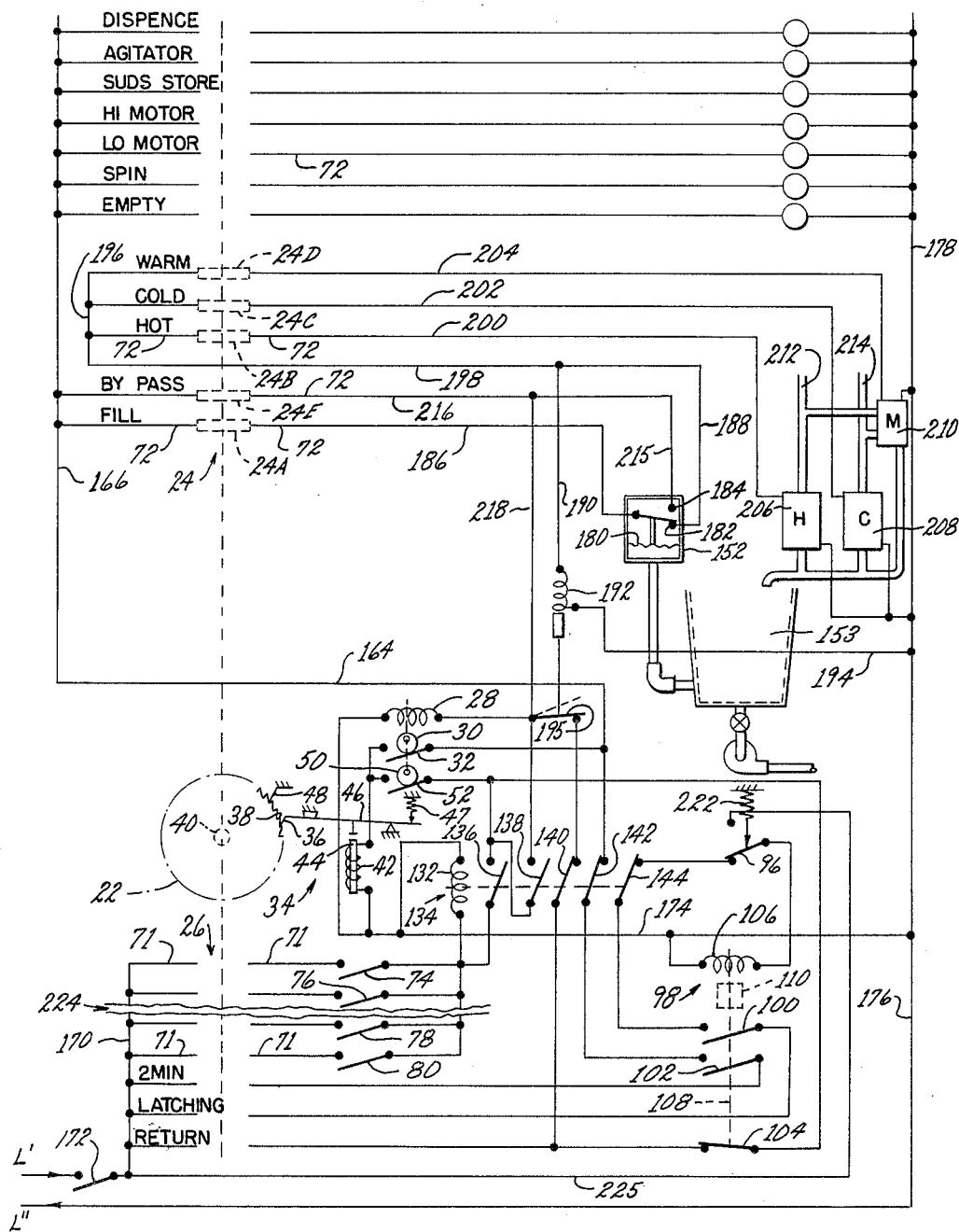
FIGURE 6 is a wiring diagram showing the controller applied to a domestic washing machine with a water level valve fill control.

Certain words indicating direction, relative position, etc., are used herein for the sake of clearness and brevity. However, it is to be understood that such words apply only to the specific disclosure in the drawings and that the actual devices may have entirely different direction, relative position, etc. Examples of such words are "upper," "lower," "vertical," "downward," "horizontal," etc.

A controller 20, FIGURES 1, 2 and 3 may have program means 24 for producing a plurality of separate programs and may have selecting means 26 for selecting the activation of any selected one of such programs. The controller may also have means for preventing the production of impulses of unselected programs while selecting the activation of any one selected program. Such means becomes apparent as elsewhere described in this application.

In general, the controller 20 may have a program-carrying member or disc 22. Such member or disc may carry program impulse-producing zones or bands 24, FIGURES 2, 16 and 17, to produce program impulses while the member or disc 22 moves at a relatively slow speed. The controller may also carry a program selecting zone or band 26 which is effective while such carrying member or disc 22 moves at relatively high speed. A plurality of zones or bands 26 may be provided, if desired.

The controller 22 may have a program-producing slow speed transmission or means 29, FIGURES 2 and 4, to move such member or disc 22 at program-producing slow speed. It may also have a program-selecting high speed transmission or means 31, FIGURES 2 and 5, to move such member 22 or disc 22 at relatively high speed to select one of such programs.

For example, the program-producing slow speed transmission 29 may be connected to a controller motor 28 which may drive a slowly moving cam 30 at a slow revolution rate, to cycle the snap switch 32, FIGURES 4 and 6, one every two minutes or the like. The snap switch 32 may be connected with a stepping relay 34, FIGURES 2, 3, 6 and 20, which quickly moves the advancing finger 36 downward for one step or interval, corresponding to one length of tooth 38 at the edge of disc 22, in a manner to rotate the disc 22 intermittently about its shaft 40. Preferably when the winding 42 of the relay 34 is energized to magnetize the core 44, the lever armature 46 is pulled down with a quick action against the upwardly spring biased action of lever 46. The lever 46 may be fulcrumed at 45 and be biased clockwise by spring 47. Immediately thereafter the lever 46 is allowed to move upwardly when the winding 42 is de-energized. A relatively stationary spring finger 48 engages the teeth 38 of disc 22 and prevents any backward rotation of disc 22 while the finger 36 is being snapped upward over the next tooth 38.

The program selecting high-speed transmission 31, FIGURES 2, 5 and 6, from the motor 28 to the disc 22 moves the disc 22 at a relatively high speed to select one of the programs 24. The high-speed transmission 31 may include a high-speed cam or rotating finger 50 which is cycled or rotated by the motor 28 once every ten seconds, for example, to cycle the snap switch 52 once every ten seconds.

Figure 16:
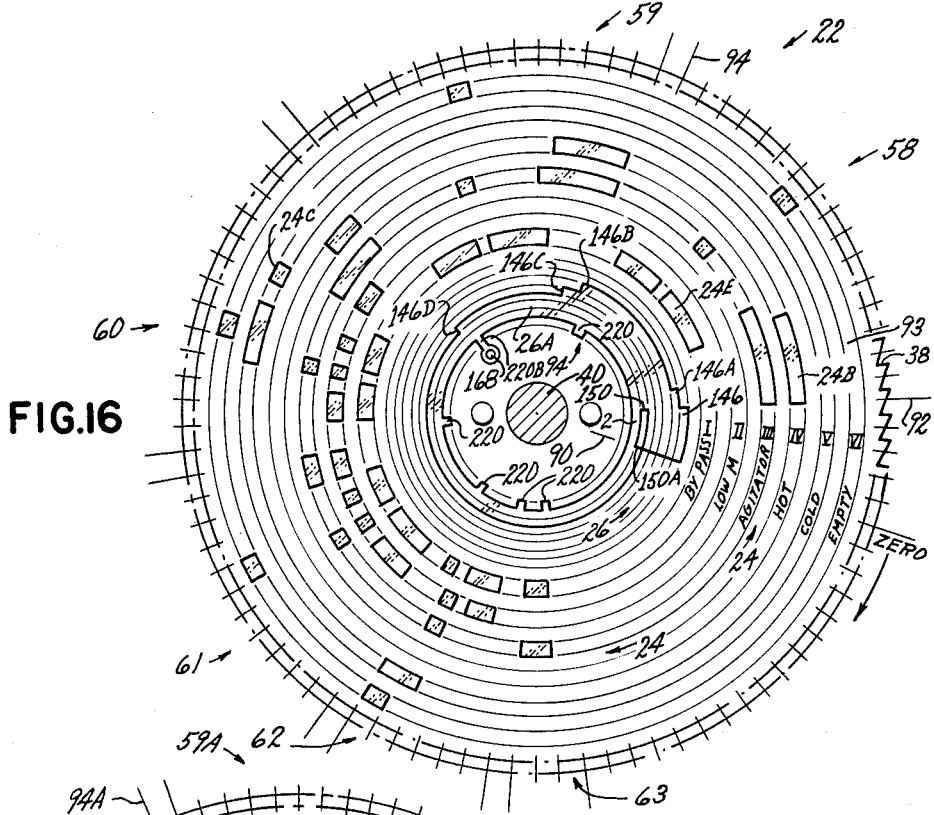
FIGURE 16 is a diagram of one side of a typical program producing disc.
Figure 17:
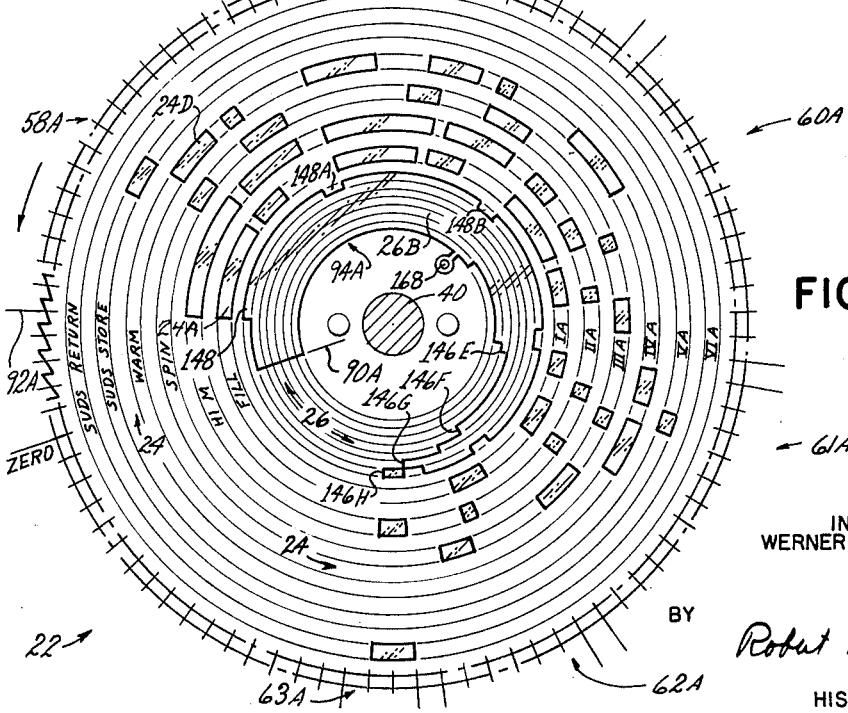
FIGURE 17 is a diagram similar to FIGURE 16 but showing the opposite side of the disc.

The disc 22 may be made of relatively stiff insulating material and may have a plurality of electrically conducting bands 24 and 26 printed thereon, and if desired, on both sides of a disc 22, as shown in FIGURES 16 and 17.

The disc 22 in FIGURES 16 and 17, may carry a plurality of programs 58 through 63 inclusive on one side of the disc and alternate or cooperating programs 58A through 63A inclusive on the other side of the disc.

A plurality of manipulators or push buttons 64, 66, 68, 70, FIGURES 1, 2 and 3, and any other additional number of push buttons as desired, may be provided to produce the desired number of programs. These push buttons may be pushed inward, or upward in FIGURE 3 to select any one desired program. The pushing in of any one selected button 64 through 70, etc., causes the disc 22 quickly to be rotated by the energization of certain program selecting reading fingers 71 by band or bands 24, so the program reading fingers 72, FIGURE 2, are caused eventually to be in contact with the electrically program conducting bands 24 of the selected program 58 to 63 and/or 58A to 63A, as desired.

The reading fingers or wires 71 and 72 and the frame for supporting them are more fully shown and described elsewhere in connection with FIGURES 18 and 19 as well as FIGURES 2 and 3.

The selecting reading fingers 71 come in contact with high-speed selecting bands 26, FIGURES 16 and 17, and cause the disc 22 to be advanced quickly to selected program 58–63, etc., where the program fingers 72 may then contact the bands or zones 24, to energize the elements of the washing machine which are to produce the selected program.

The construction is such that when a push button 64, 66, 68, 70, etc., is pushed in, corresponding selecting switches 74, 76, 78, 80, etc., FIGURES 2, 3, and 6, are closed.

The switches 74, 76, 78, 80, etc., are held closed respectively by the push rods 82, 84, 86, 88, etc., FIGURES 3, 13, 14 and 15, which are carried by or attached to the push buttons 60–70, etc.

The selected inwardly pushed button, such as 64, initiates a high-speed program selection, so the disc 22 quickly rotates by impulses from switch 52, FIGURES 2 and 5, to the beginning of a selected program, such as program 58, FIGURE 16. Then the transmission or electrical circuits are changed, so the fingers 72 then read the selected slow-speed program contacts 24, while the disc 22 moves the selected program 58 under the fingers 72 from the beginning to the end of the selected program 58. At the end of the selected program 58, the disc 22 is quickly rotated to return it with the zero position 90 under the ends of reading fingers 71.

For example, the zero position may extend along the radius 90 and 90A, FIGURES 16 and 17, respectively.

Before any push buttons 64–70, etc., are pushed in, the row of reading fingers 71 and 72 may be aligned along the radii 90 and 90A, since the fingers 71 and 72 are on both sides of the disc 22.

For example, when the selector push button 64 is pushed in, the selected switch 74 is closed, then the disc 22 will be rotated, clockwise in FIGURE 16 and counterclockwise in FIGURE 17, and will be quickly advanced to the beginning of the selected program which may be, for example, 58, 58A, with the program fingers 72 now aligned along the radii 92, 92A. The quick motion from radii 90, 90A to 92, 92A, is produced by the stepping transmission or cam 50 and relay 34, FIGURE 6, for example. Then the electrical system is changed, so that the slow motion cam or transmission 30 begins a slow stepping movement of the relay 34, so that the disc 22 is slowly advanced by two-minute steps from the radii 92, 92A to the radii 94, 94A at the end of program 58, 58A. The next slow step of the disc 22 changes the electrical circuits of the controller, so the disc 22 is then quickly rotated by the fast stepping action of cam 50, switch 52 and relay 34, so the disc 22 is fast stepped to a position where the reading fingers 71 and 72 are again aligned with the zero position or radii 90, 90A and are ready for another selection of a program. In the meantime, however, the previously selected push button 64 has been released and has returned to normal position, so that all of the selector buttons 64, 66, 68, 70, etc., are now equally ready to receive a push or selection of a program.

In addition, if desired, an emergency push button 96 may be provided, which if pushed in and released, will cause the disc 22 quickly to be moved by the fast stepping cam 50, switch 52, and relay 34 from whatever position the disc 22 may be in, so that the disc is quickly returned to the zero position so the fingers 71, 72 are in alignment with the radii 90, 90A.

A latching and unlatching relay 98, FIGURES 2, 3, 6, etc., has means for holding the selected button 64, 66, 68, 70, etc., in pushed in condition, to hold in closed condition the corresponding switch 74, 76, 78, 80, etc., and also to hold the latching relay switches 100, 102, and 104 in latched condition (upper positions in FIGURES 8, 9, 10) in a manner to cause selection of the desired program by the circuit in heavy lines in FIGURE 8. The latching relay 98 has an unlatching latching solenoid 106 which, when energized, pulls the latching and unlatching bar 108 leftward in FIGURES 3 and 13, from its rightwardly biased position. The bar 108 is rightwardly biased, FIGURES 3 and 13, by means of the spring 110, FIGURES 3 and 15, which spring has one end stationarily held by the stationary wall 112 and has its other end rightwardly pushing the washer 114 which is rigidly attached to the bar 108.

Whenever a selected button 64, 66, 68, 70, etc., is pushed inward, its corresponding push rod 82, 84, 86, 88, etc., also moves inward and has its corresponding cam 116, FIGURES 3 and 15, engage, and be locked by, the slanting tongue 118 of the bar 108. This pushes the bar 108 leftwardly and causes the cam 116 to hook over the tongue 118, as shown in FIGURE 15, to retain the rod 82 and button 64 in pushed in condition and with the bar 108 in a slightly leftward position, to maintain the switches 102, 104 and 106, in their latched position, which are the upward positions in FIGURES 8, 9 and 10. After the push button, such as 64, has been pushed in and locked in place by the cam 116 and tongue 118, the push button will remain in the pushed in position, and will hold switch 74 closed until such time as the latching solenoid 106 is temporarily energized, as in FIGURE 10, at the end of program 58, to pull the bar 108 slightly leftwardly in FIGURE 3 and upwardly in FIGURE 10, against the compression spring 110, a sufficient distance, so the lip 118 is moved out of engagement with the cam 116, which permits the compression spring 120 to snap the push button 64 outward to its original or normal position.

Thereafter, when the solenoid 106 is de-energized, as in FIGURE 11, the compression spring 110 pushes the rod 108 rightward in FIGURE 3 or downward in FIG- URE 11, to its original full line position shown in FIG- URE 3, in which position, the switches 74, 76, 78, 80, etc. are open and the switches 102, 104, 106 are in their unlatched condition or downward condition in FIGURES 6, 7 and 11.

The armature 122 of latching and unlatching solenoid 106 may be connected with the bar 108 by a pin construction or the like 124, FIGURE 3.

Means are provided for causing the bar 108 to prevent any other button such as 66, 68, 70, etc., from being pushed in after a selected button 64 has already been pushed in. To this end each rod 82, 84, 86, 88, etc., has an upward flange 126, FIGURE 14, which passes through a narrow opening 128 in bar 108 at the earliest inward movement of the respective button, such as 64, and before the cam 116 has moved the bar 108. After the passage of the flange 126 through opening 128, the cam 116 moves the bar 108 leftward and eventually is hooked as shown in FIGURE 15, but in this position the bar 108 remains slightly leftward from its original unlatched position of FIGURE 3. Therefore, all of the narrow openings 128 are moved slightly leftward, as indicated in dotted lines at 128A in FIGURE 13. Thereafter if an attempt is made to push any other button, such as 66, 68, 70, etc., their respective flange 126 will be out of alignment with its respective opening 128 and will not permit the respective button 66, 68, 70, etc., to be pushed in.

When the solenoid 106 is temporarily energized and moves the bar 108 leftward, the cam 116 is released and the button 64 starts to move outward, that is downward in FIGURE 15, because of compression spring 120. However, it will be temporarily arrested near its final outward movement because the flange 126 cannot pass the displaced slot 128. However, when the solenoid 106 is de-energized, the bar 108 returns to its rightward position of FIGURE 3 where the slot 128 is in alignment with the flange 126 and allows it to pass downward in FIGURE 15 to return button 64 to its original position.

If desired the rods 82, 84, 86, 88, etc., may be each made thicker at 82A, 84A, 86A, 88A, etc., than the next lower numbered rod, as shown in FIGURE 3. This causes any lower numbered rod, 82A, 84A, 86A, 88A, etc., to be released by the bar 108 if a higher numbered rod should accidentally be simultaneously pushed in. Since the cam 116 of the highest numbered rod will push the bar 108 farther leftward this will move the slanting tongue 118 of any lower numbered rod out of engagement with its corresponding cam 116 and will release such lower numbered rod. This will cause only the highest numbered rod to remain in latched condition.

Each push button 64, 66, 68, 70, etc., is preferably connected to the selecting circuits so each higher numbered push button will cause the disc to be stepped farther around to select programs farther removed from the starting radii 90 and 90A.

Whenever any push button 64, 66, 68, 70, etc., is pushed in to close its respective switch 74, 76, 78, 80, etc., such as 74 in FIGURE 8, the solenoid 132 of cycle relay 134 is energized. This pulls the switches 136, 138, 140, 142, 144, leftwardly from their normally biased rightward position of FIGURE 6 to the leftward position shown in FIGURE 8. This occurs, provided that an impulse band 146, FIGURES 8 and 16, on the disc 22 bridges two reading fingers 71, 71. When this happens, the fast stepping circuit shown in heavy lines in FIGURE 8 is established which connects the lines L' and L'' with the solenoids 42, and 132, and with the motor 28. The motor 28 drives the fast moving cam 50 to cycle the snap switch 52 at a fast stepping speed, once every ten seconds, for example, which likewise cycles the solenoid 42 at the same speed. This, in turn, rocks the lever 46 at the same cycle speed and fast steps the disc 22 from the zero position 90, 90A, FIGURES 16 and 17, to the starting position 92, 92A of the selected program which may be, for example, program 58, 58A. The fast stepping band 146 terminates at this position which terminates the fast stepping rate of the solenoid 42 by the unbridging of reading fingers 71, 71. At this same position, the slow stepping band 148, FIGURES 9 and 17, bridges corresponding reading fingers 71, 71, FIGURE 9, and the band 150, FIGURES 9 and 16, likewise bridges a pair of reading fingers, 71, 71, as shown in FIGURE 9. With the bands 148 and 150 bridging their respective pairs reading fingers, the circuit shown in full lines in FIGURE 9 is established.

The selection of other programs, such as a modified program 58, and programs 59–63, and 59A–63A, may be selected by pushing any one of the buttons 66, 68, 70 or any other additional buttons which may be necessary to provide selection for the desired number of programs.

For example, if push button 66 is pushed instead of button 64, then the band 146A of FIGURE 16 may bridge the similar pair of reading fingers 71 in FIGURE 8 instead of band 146, and the switch 76 would be closed instead of switch 74. The circuit to solenoid 132 and to switch 52 and relay 42 would then be closed in a manner to provide fast stepping of disc 22 with the FIGURE 8 circuit until the terminus of band 146A breaks the bridge between the reading fingers 71, 71. The circuit then would be changed to the program circuit of FIGURE 9.

When any other of the push buttons 68, 70 or any one of other possible push buttons are pushed, the circuit of FIGURE 8 is changed only in that bands 146B, 146C, 146D will bridge pairs of reading fingers that are in series with switches 78, 80 or other similar switches that may be provided. This will fast step the disc 22 to the beginning of the corresponding program. The bands 146F– 146H on the opposite side of disc 22, as shown in FIGURE 17, may similarly bridge the circuits of FIGURE 8 which may have switches 74X, 74Y, etc., to fast step the disc 22 to the beginning of any one of programs 61, 61A, 62, 62A, 63 and 63A, as is obvious.

The circuit shown in FIGURE 9 causes the program disc 22 to be stepped at a slow rate, such as once every 2 minutes, by the slow moving cam 30, which operates the slow stepping switch 32 and energizes the stepping solenoid 42 at a slow rate, to rock the lever 46 once every two minutes, thus to move the disc 22 at steps which occur only once every 2 minutes.

Since the band 146 or other bands 146A–146G of FIGURE 8 is no longer effective under FIGURE 9 conditions, the cycle solenoid 134 is de-energized in FIGURE 9, and this allows the switches 136 through 144 to return to their normal, or rightward position as shown in FIGURE 9.

When any of the push buttons 64, 66, 68, etc., was pushed in, to establish the conditions of FIGURE 8, the push button cam 116 moved the rod 108 leftward in FIGURE 3 and upward in FIGURES 8 and 9, to close the switches 100 and 102 and to open the switch 104. These switches will remain in this position throughout the conditions of FIGURES 8, 9 and 10 but will return to their lower position, in FIGURE 11, to fast step the disc 22 back to zero position under the conditions of FIGURE 11, as will become apparent.

With the conditions of FIGURE 9, the wash programs 58, 58A or other programs may be performed at the slow stepping speed produced by the slow stepping cam 30. During the performance of these programs certain program impulse bands 24 will become effective upon their corresponding pairs of reading fingers 72, to energize the desired elements of the washing machine or other member to be controlled, as elsewhere described. These program producing bands lie within the circular bands indicated by the Roman numerals I, II, III, IV, V, VI, in FIGURE 16, and by the Roman numerals IA, IIA, IIIA, IVA, VA, and VIA, in FIGURE 17. The disc 22 will energize the corresponding reading fingers 72, which contact the particular band in these Roman numeral indicated circles, to produce the desired functions of the washing machine for the particular program which has been selected.

Merely by way of example, a typical washing program is indicated elsewhere for the programs 58, 58A, in FIGURES 8–12 in which the tub of the washing machine is filled by a water level switch system, such as shown in FIGURE 6. However, a corresponding program is indicated in FIGURES 8A–12A, in which the washing machine program may be performed with a washing machine in which the tub is filled by a timer control fill system, which does not arrest the slow stepping motion of the disc 22, while the tub is being filled, as shown in FIGURE. 7.

The particular washing programs desired by the washing machine manufacturer may be controlled by the controller of this invention merely by printing the proper bands or zones 24 and 26 on a disc 22 to provide the desired washing program. Hence any programs herein specifically illustrated may be varied to accommodate the desires of the manufacturer of the washing machine or of any controlled machine other than a washing machine, as is obvious.

When any component of a washing machine or the like requires a heavy current, such as the washing machine motor, a suitable relay may be energized by the control circuit of this invention, which relay will, in turn, energize the motor.

FIGURE 9 shows the establishment of a selected program by any one of the push buttons 64, 66, 68, 70, etc., as required. This action occurs after the quick stepping action of FIGURE 8 has terminated at the end of the quick stepping band 146, 146A, etc., a slow stepping program circuit is established.

The slow stepping program circuit of FIGURE 9 may be connected with the program bands 24 of FIGURE 6 when the washing machine has a water level control fill switch 152 to fill the tub 153. Alternatively, the program circuit of FIGURE 9 may be connected with the program bands 24 of FIGURE 7 when the washing machine has the timer controlled filling means 154 to fill the tub 155.

In FIGURE 6, the timer motor 28 is stopped while the tub 153 is being filled under the control of water level switch 152. The timer motor 28 does not operate again until after the tub 153 is filled to the selected level.

In FIGURE 7 the timer motor 28 continues to run and continues to slow step the disc 22 during the tub filling operation. The timer energizes and opens any of the selected solenoid valves 156, 157, 158 for a predetermined period of time sufficient to fill the tub 155 to the selected level. This is accomplished, substantially regardless of the water supply pressure at 159 and 160 because of the constant flow control valve 162 which delivers water substantially at a correct and constant rate to fill the tub.

In FIGURES 6 and 9 the closed switch 142 and the FIGURE 9 closed switch 102 and disc band 148 connect power line L' through connecting line 164 to a program reading finger supply line 166, FIGURE 6, which remains energized during the action of FIGURES 9 and 10 to energize the left-hand power supply fingers 72 which supply power to the right-hand fingers 72 by being bridged at the correct time by proper program disc bands 24. Each program band 24 may be bridged by pairs 72A of fingers 72, as shown in FIGURE 2, one of the fingers of each pair being a left-hand supply finger 72 (FIGURES 6 or 7) and the other finger being a right-hand finger 72 (FIGURE 6 or 7).

The central band 26A, FIGURE 16, and central band 26B, FIGURE 17, are electrically connected by a pin 168 which passed through the disc 22. The conducting circle 2 of FIGURE 16 is a continuous conductor on band 26A so that line L' is connected throughout bands 26A and 26B if any left-hand finger 71 contacts any part of band 26A or 26B. The left-hand fingers 71 are connected to power supply line 170 that may be connected to line L' by a master switch 172.

The flow of current, FIGURE 6, may generally be considered as flowing from line L' through disc bridged fingers 71 to the stepping control members such as 52, 98 and 106, shown in FIGURES 8–12 generally through the bridging control of central bands 26A and 26B and through return lines 174 and 176 to line L". The program control may be considered as passing from line L, band 148, FIGURE 9, closed switches 102, 142 connecting lines 164 and 166, FIGURE 6, fingers 72 bridged through program disc bands 24 at proper times, then through the washing machine control components and to return lines 178, 176 and back to L".

The temporary stopping of timer motor 28 during the fill operation of FIGURE 6 may be performed by any suitable means. For example, the water level switch 152 well known, per se, may have a diaphragm 180 which is responsive to the water level in tub 153. The diaphragm 180 closes contact 182 when the tub is not full to the desired level and closes contact 184 when the tub has been filled to the desired level. When a disc band 24A bridges its contacting fingers 72, 72, FIGURE 6, while the tub 153 is below full condition and contacts are closed at 182, then a timer stopping circuit is energized which includes L', 172, 170, 71, 148, 71, 102, 142, 164 of FIGURE 9 and 166, 72, 24A, 72 of FIGURE 6 and continues through line 186, contact 182, line 188 and energized and open relay 192, and return lines 194, 176 and L". This circuit opens switch 195 of relay 192 which opens the power circuit to timer motor 28, FIGURE 6, and stops the timer until the tub is filled to the desired level.

While the timer is so stopped, the sub-power line 196 is energized from line 166, band 24A, line 186, contact 182, and lines 188 and 198. Also the timer disc 22 is in a position to bridge one or more of the water solenoid lines 200, 202 and 204 by one or more disc bands 24B, 24C, and/or 24D which would respectively energize the hot water, cold water, and the mixed water solenoids 206, 208 and/or 210 which control the flow of hot, cold or mixed water from the hot and cold water supply lines 212 and 214 to the tub 153.

The flow of water into the tub 153 continues as long as the water level switch contact 182 is energized and stops when the tub is filled to the desired level when the contact 182 is opened. The timer then begins to run because the relay 192 is de-energized and its switch 195 is closed, and also because contact 184 is closed. The closing of either of these switches 184 or 195 energizes the timer motor 28. Closed switch 184 energizes lines 215 and 218 to energize timer motor 28.

After the timer has run a certain time, the bypass band 24E, FIGURE 6, bridges its reading fingers 72, 72, and energizes lines 216 and 218 so the timer continues to run even if contact 182 is closed when the tub is later emptied.

After the tub has been filled, "agitation," "spin," "suds store," etc., may be energized for the desired washing machine program as provided by the program bands 24 of the selected program.

After the selected program has been completed, the heavy line circuit of FIGURE 10 is established to produce the momentary energization of the solenoid 106 of the relay 98 by the unlatching band 220 which bridges its corresponding reading fingers 71, 71 and establishes a circuit from L', line 170, band 200, through switches 100, 144, 96, solenoid 106, and return line 174 to L''. The energization of solenoid 106 pulls the latching and unlatching bar 108 to its farthest upward position in FIGURE 10 (leftward in FIGURES 3 and 13) and releases any cam 116 which may previously have been latched by its corresponding tongue 118. The duration of energization of solenoid 106 by any band 220 is relatively short, as shown in FIGURE 16, so that the next two minute step of the disc 22 moves the band 220 out of contact with its fingers 71, 71 to de-energize solenoid 106 and to cause bar 108 to be moved by spring 110 to its farthest rightward position. This moves the relay switches 100, 102, 104 to the positions shown in FIGURE 11, to establish the heavy line circuit of FIGURE 11.

FIGURE 11 shows the condition established at the end of program 58 and 58A. It is also illustrative of similar conditions established at the end of any other selected program, such as 59, 59A, 60, 60A, etc. At this time bands 148 and 220 are moved away from their respective reading fingers 71, 71 by vacant space 148A, FIGURE 17, and termination of band 220, and only band 150 and its reading fingers remain in effective condition. A fast-stepping disc return circuit is established as shown in heavy lines, FIGURE 11, from L', 172, 150, 104, high speed switch 52, stepping relay 42, return lines 174, 176 and L''. This causes the advancing finger 36 of relay 42 to step the disc 22 at high speed until the band 150 and its reading fingers 71, 71 reach the "start" relationship at 150A. The controller is now ready for a new program selection.

The disc 22 may be returned by fast-stepping action at any time desired by pushing in emergency push button switch 96, holding it in for a short interval and then releasing it. The push button 96 is biased outward by compression spring 222.

FIGURE 12 shows the heavy line circuit established while the emergency button 96 is pushed in. This circuit includes L', master switch 172, emergency line 225, push button switch 96, unlatching solenoid 106, return lines 174, 176 and L''. Relay 98 is then ready to unlatch the bar 108 whenever the emergency button 96 is released.

The release of push button 96, FIGURE 12, establishes the quick stepping return circuit shown in FIGURE 11 which includes L', 172, 150, 104, 52, 42, 174, 176 and L''. The fast cycling switch 52 fast steps the relay 42 to return the disc 22 to position 150A where the reading fingers 71, 71 of band 150 are de-energized by the terminating of band 150.

The program bands 24 are energized solely by line 164. The line 164 can never be energized during the fast-stepping or selecting operation produced by fast cycling switch 52 and stepping relay 42. This is illustrated in FIGURE 11 wherein switch 104 is closed to produce the fast-stepping circuit. However, the program feed line is simultaneously de-energized by the opening of switch 102 which is operated simultaneously by relay bar 108 so switch 102 is open when switch 104 is closed and vice versa.

Program energizing line 164 of FIGURE 8 similarly is de-energized while the fast-stepping program selecting action of FIGURE 8 is taking place because of the combined action of relays 98 and 134. Hence means are provided for preventing the production of program impulses by program bands 24 while the fast-stepping return action of FIGURE 11 or the fast-stepping selecting action of FIGURE 8 is taking place. This prevents any accidental energization of the washing machine components during the fast-stepping action.

If push button 66 had been pushed in instead of push button 64 (or similarly any of the other buttons 68, 70, etc.) then the fast-stepping operation of FIGURE 8 would have been produced by selecting band 146A, so the fill and wash operations of FIGURES 9 and 6 would not have been started until disc 22 had reached the radius 93 since relay 134 would not have been de-energized until that time. The program would be stopped at radii 94, 94A, FIGURES 16 and 17, as previously described in connection with FIGURE 10, and the disc would have been quick step returned to "start" as in FIGURE 11.

If push button 68 had been selected instead of buttons 64 or 66, then the disc 22 would have been quick stepped, as in FIGURE 8, to the position 146B, FIGURE 16, by a selecting band, not shown in FIGURE 8, since it would lie within the break lines 224 of FIGURE 8. The program 59 would then be established with the conditions of FIGURES 6 and 9 and would be produced by the desired program bands 24 provided in that program and would be stopped by the break at 148B, and would be returned by unlatching band 220B under conditions of FIGURES 10 and 11.

Any other selective buttons which might be provided, could similarly be used and actuated, as is obvious.

The desired operations and actuations of the washing machine by properly provided program bands 24 are obvious to those skilled in this art.

FIGURES 7, 8A, 9A, 10A, 11A and 12A are intended to indicate washing machine systems corresponding to FIGURES 6 and 8–12 except that the tub 155 of FIGURE 7 is to be filled by the constant flow valve 162 while the respective hot, cold and mixed water control solenoid valves 156, 157 and 158 are energized to open position for the proper length of time to fill the tub 155 to the desired level. The description of the timed fill system indicated is not again repeated in connection with FIGURES 7, 8A, 9A, 10A, 11A and 12A, as its operation is now obvious to those skilled in the art because of the disclosure herein in connection with FIGURES 6 and 8–12.

FIGURES 18 and 19, in connection with FIGURES 2 and 3 show the reading finger construction. An insulating frame 226 is supported at one end by the end 228 of a rod 230 which is received in an opening in the lug 232 of frame 226. The rod 230 is supported rigidly at its other end 234 by a nut construction on the controller wall 236.

The frame 226 is supported at its other end by the end 238 of rod 240 which is received in notch 241 in lug 243 of frame 226. The rod 240 is secured at its other end 242 to the frame 236 by a nut construction as shown.

The frame 226 has a notch 244 to receive the disc 22 which is rotatably supported on an axial disc shaft 40 which is supported at its other end on frame wall 236 by a nut construction 246.

The fingers 71 and 72 are silver spring wires which pass through the arms 248 and 250 of electrically insulating frame 226. These wire fingers 71 and 72 slantingly engage both sides of disc 22 and balance each other and allow the frame 226 to position itself in balanced condition with its arms 248 and 250 straddling the disc 22.

The reading finger constructions 71—71 for reading the selecting zones or bands 26A and 26B of the composite high speed zone 26 have been illustrated in the wiring diagrams as having a pair of reading fingers 71, 71 for each small band 146, 146A, 148, 150, etc. Such illustration of two fingers for each of these small bands has been used to simplify the illustrations and description.

However, it is possible to use single reading fingers 71 for each of these small bands instead of the two illustrated and described. For this purpose the composite high speed zone 26, including bands 26A, 26B, small bands 146, 146A, 148, 150, etc., may be electrically interconnected so the entire zone 26 may be made continuously "hot" from line L', for example, as long as master switch 172 is closed, and a single master left-hand reading finger 71 contacts the continuous small band 2, FIGURE 16. The band 2 is electrically connected to all of the small, high speed bands 146, 146A, 150, 220, etc., shown in FIGURE 16, since the entire band 26A is completely solid and electrically interconnected. The band 26A, in turn, is electrically interconnected to the band 26B of FIGURE 17 by the electrically conducting pin 168 which passes through the insulating disc 22 and is electrically connected at both sides of the disc 22 to bands 26A and 26B by conducting connectors such as indicated at 220B, FIGURE 16, which is connected to continuous band 2, and the similar connector surrounding pin 168 in FIGURE 17. Hence only one reading finger 71 each for each small band 146, 146A, 150, 148, 146E, 146F, etc., is required to control each quick stepping operation, in combination with the single, master, reading finger which is connected to continuous band 2, FIGURE 16.

A new and useful automatic program selecting controller and method of control have been provided by this invention.

While the form of the invention now preferred has been disclosed as required by the statutes, other forms may be used, all coming within the scope of the claims which follow.

What is claimed is:

1. A controller comprising: a program means for producing a plurality of separate programs each producing sequential control impulses including a freely rotatable disc with an electrically insulative flat surface and with program producing electrically conductive strips circularly secured on said flat surface aiding in producing said programs, said disc having stepping teeth, an electromagnetic relay having a reciprocable advancing finger engaging said teeth for step by step rotation of said disc by intermittent electrical energization of said relay, pairs of electrically conductive fingers engaging said flat surface and said strips, a controller motor having a cycling switch means, a cycling and electrical conductive circuit means energized and deenergized by said reading fingers and cycling switch means; and selecting means for automatically selecting the activation of said electrical conductive circuit means to produce a selected one of said programs.

2. A controller comprising: a freely movable impulse producing program member of one electrical conductivity characteristic having a plurality of programs of impulse producing bands of a different electrical conductivity characteristic to be effective while said member moves at relatively slow speed; said program member having stepping teeth to aid in moving said program member; an electromagnetic relay having a reciprocable advancing finger engaging said teeth for step by step movement of said program member, said relay reciprocating said advancing finger by intermittent electrical energization of said relay; electrically conductive reading fingers engaging said program member and said bands; program producing means for moving said member at said relatively slow speed to produce said impulses including a controller motor having a relatively slowly cycling switch means intermittently energizing said relay, and electrical conductive circuit means energized and deenergized by some of said reading fingers and said relatively slowly cycling switch means; and program selecting means to move said program member at relatively high speed to select one of said programs including a relatively fast cycling switch means operated by said motor intermittently energizing said relay and energizing and deenergizing said electrical conductive circuit means with some of said reading fingers.

3. A controller comprising: a program carrying member carrying a plurality of programs, each program having a plurality of program impulse producing zones to produce a set of program impulses while said member moves at relatively slow speed through a selected program in quick steps with relatively long intervals between said steps, said carrying member carrying program selecting zones to select one of said programs while said carrying member moves at relatively high speed to a selected program in quick steps with relatively short intervals between said last-named steps; a controller motor; a program producing slow speed transmission from said motor to said carrying member to move said member at said relatively slow speed in quick steps with relatively long intervals between said steps to produce said selected program impulses; and a program selecting high speed transmission from said motor to said carrying member to move said member at relatively high speed in quick steps with relatively short intervals between said last named steps to select one of said programs.

4. A controller according to claim 3, having means preventing the production of said program impulses while said high speed transmission moves said member at said relatively high speed.

5. A controller according to claim 3 having a plurality of selectively actuatable manipulators and means controlled by said respective manipulators to cause said high speed transmission to select a respective one of said programs and to cause said slow speed transmission to produce its program impulses and in which each of said manipultors has means to prevent actuation of the other manipulators when said each one of said manipulators is in manipulated position.

6. A controller according to claim 3 in which said slow speed transmission includes a relatively low speed make and break switch operated by said motor which energizes and deenergizes an electromagnetic relay to move said program carrying member, and in which said high speed transmission includes a relatively high speed make and break switch which energizes and deenergizes an electromagnetic relay to move said program carrying member.

7. A controller according to claim 3 in which said transmissions include a tooth construction on said carrying member, an advancing tooth engaging construction engaging said tooth construction an electromagnetic relay operatively connected to said tooth engaging construction, a slow speed make and break switch and a high speed make and break switch operated by said motor and selectively energizing said relay.

8. A controller comprising: a unitary impulse production member having an electrically insulative surface and a plurality of programs of electrically conductive impulse producing bands to be effective while said member moves at relatively slow speed; moving means for moving said member; conductive reading fingers contacting said insulative surface and said bands; a motor having program producing means for energizing said moving means at a first rate to move said member at said relatively slow speed to produce said impulses; program selecting means on said member causing said motor to energize said moving means at a second rate to move said program producing member at relatively high speed to select one of said programs; and return means causing said motor to operate said moving means to move said impulse producing member to a starting position.

9. A controller comprising: a unitary impulse production member having an electrically insulative surface and a plurality of programs of electrically conductive impulse producing bands to be effective while said member moves at relatively slow speed; relay means for moving said member; conductive reading finger contacting said insulative surface and said bands; a motor having program producing means for energizing said relay means at a first rate to move said member at said relatively slow speed to produce said impulses; program selecting means on said member causing said motor to energize said relay means at a second rate to move said program producing member at relatively high speed to select one of said programs; and return means causing said motor to operate said relay means to move said impulse producing member to a starting position.

(References on following page)

References Cited by the Examiner

UNITED STATES PATENTS

| | | | |
|---|---|---|---|
| 2,055,031 | 9/36 | Hutchings | 318—162 |
| 2,082,697 | 6/37 | Ingerson | 340—357 |
| 2,302,923 | 11/42 | Zimarik | 200—46 |
| 2,477,741 | 8/49 | Haberman | 200—46 |
| 2,585,018 | 2/52 | Kreitchman et al. | 200—38 |
| 2,656,109 | 10/53 | Lindars | 200—46 |
| 2,701,357 | 2/55 | Newby | 340—345 |
| 2,779,937 | 1/57 | Pellerin et al. | 340—265 |
| 2,899,673 | 8/59 | Reiner | 318—162 |
| 2,995,143 | 8/61 | Strathearn et al. | 137—624.11 |
| 3,101,435 | 8/63 | Welch et al. | 318—162 |
| 3,104,292 | 9/63 | Holzer | 200—46 |

NEIL C. READ, *Primary Examiner.*

W. F. OHLER, *Examiner.*